(12) United States Patent
Roquiny et al.

(10) Patent No.: US 8,231,977 B2
(45) Date of Patent: Jul. 31, 2012

(54) SUN BLOCKING STACK

(75) Inventors: Philippe Roquiny, Jumet (BE); Andre Hecq, Jumet (BE)

(73) Assignee: AGC Glass Europe, Brussels (BE)

( * ) Notice: Subject to any disclaimer, the term of this patent is extended or adjusted under 35 U.S.C. 154(b) by 355 days.

(21) Appl. No.: 11/913,943

(22) PCT Filed: May 10, 2006

(86) PCT No.: PCT/EP2006/062204
§ 371 (c)(1),
(2), (4) Date: May 6, 2008

(87) PCT Pub. No.: WO2006/122900
PCT Pub. Date: Nov. 23, 2006

(65) Prior Publication Data
US 2008/0311389 A1 Dec. 18, 2008

(30) Foreign Application Priority Data
May 11, 2005 (EP) .................................. 05103917

(51) Int. Cl.
*B32B 15/04* (2006.01)
*B32B 17/06* (2006.01)

(52) U.S. Cl. ......... 428/433; 428/432; 428/689; 428/699

(58) Field of Classification Search .................. 428/216, 428/432, 697, 433, 689, 699, 701, 702
See application file for complete search history.

(56) References Cited

U.S. PATENT DOCUMENTS

| | | | |
|---|---|---|---|
| 5,279,722 A | 1/1994 | Szczyrbowski et al. | |
| 6,045,896 A * | 4/2000 | Boire et al. | 428/216 |
| 6,210,784 B1 | 4/2001 | Rondeau et al. | |
| 6,355,334 B1 * | 3/2002 | Rondeau et al. | 428/212 |
| 6,605,358 B1 | 8/2003 | Stachowiak | |
| 2002/0045037 A1 | 4/2002 | Boire et al. | |
| 2002/0102394 A1 | 8/2002 | MacQuart et al. | |
| 2002/0136905 A1 | 9/2002 | Medwick et al. | |
| 2003/0143401 A1 | 7/2003 | Hukari et al. | |
| 2005/0123772 A1 * | 6/2005 | Coustet et al. | 428/432 |
| 2005/0208281 A1 * | 9/2005 | Decroupet et al. | 428/216 |
| 2006/0029754 A1 | 2/2006 | Medwick et al. | |
| 2006/0246300 A1 * | 11/2006 | Hevesi | 428/432 |
| 2008/0187692 A1 | 8/2008 | Roquiny et al. | |

FOREIGN PATENT DOCUMENTS

| | | | |
|---|---|---|---|
| EP | 1498398 | | 1/2005 |
| FR | 2708262 | | 2/1995 |
| FR | 2717171 | | 9/1995 |
| GB | 2279365 | * | 1/1995 |
| WO | WO-02-48065 | * | 6/2002 |
| WO | WO-03-106363 | * | 12/2003 |
| WO | WO-2005012200 | * | 2/2005 |

OTHER PUBLICATIONS

U.S. Appl. No. 12/428,708, filed Apr. 23, 2009, Roquiny.
U.S. Appl. No. 11/577,925, filed Apr. 25, 2007, Roquiny, et al.

* cited by examiner

*Primary Examiner* — Jennifer McNeil
*Assistant Examiner* — Lauren Robinson
(74) *Attorney, Agent, or Firm* — Oblon, Spivak, McClelland, Maier & Neustadt, L.L.P.

(57) ABSTRACT

A multilayer sunshield lamination structure foamed on a sheet of vitreous material which includes at least one functional layer composed of a silver-based material that reflects infrared radiation and at least two dielectric coatings, each function layer being surrounded by dielectric coatings. The lamination structure, when deposited on an ordinary clear soda-lime float glass sheet 6 mm thick, has a solar factor SF of less than 45% and a light transmission LT of less than 70%. The lamination structure is composed of an essentially metal absorbent material based on the following elements: Pd, Pt, Au, Tr, Rh, Ru, Os, Co, Ni, Cu, Cr, La, Ce, Pr, Nd, W, Si, Zn, Mo, Mn, Ti, V, Nb, Hf, Ta and alloys thereof arranged in the immediate vicinity of the functional layer or included in this functional layer.

42 Claims, No Drawings

SUN BLOCKING STACK

CROSS-REFERENCE TO RELATED APPLICATIONS

This application is the entry into the United States of PCT Application Number PCT/EP2006/062204 filed May 10, 2006 and claims priority from European Patent Application No. 05103917.0 filed May 11, 2005, the entirety of each of which is hereby incorporated by reference.

BACKGROUND

The present invention relates to a multilayer sunshield lamination structure formed on a sheet of vitreous material, a glass sheet bearing said lamination structure as well as a multiple glazing incorporating such a glass sheet.

Sunshield lamination structures, to which the present invention relates, comprise at least one functional layer based on a material that reflects infrared radiation and at least two dielectric coatings, one of which is the first dielectric coating deposited directly onto the sheet of vitreous material and the other lies on the outside in relation to the functional layer or layers, each functional layer being surrounded by dielectric coatings. These different layers are deposited by reduced-pressure cathodic sputtering assisted by a magnetic field, for example, in a well known magnetron type device.

These sunshield laminations are used to form sun-protection glazings in order to reduce the risk of excessive temperature rise, for example, in an enclosed space with large glazed surfaces as a result of insolation and to thus reduce the power load to be taken into account for air-conditioning in summer. In this case, the glazing must allow the least possible amount of total solar energy radiation to pass through, i.e. it must have the lowest possible solar factor (SF or g). However, it is highly desirable that it guarantees a certain level of light transmission (LT) in order to provide a sufficient level of illumination inside the building. These somewhat conflicting requirements express the requirement to obtain a glazing unit with an elevated selectivity (S), defined by the ratio of light transmission to solar factor. These sunshield laminations also have a low emissivity, which allows a reduction in the heat loss through high wavelength infrared radiation. Thus, they improve the thermal insulation of large glazed surfaces and reduce energy losses and heating costs in cold periods.

The light transmission (LT) is the percentage of incident light flux, of illuminant D65, transmitted by the glazing. The solar factor (SF or g) is the percentage of incident energy radiation, which, on the one hand, is directly transmitted by the glazing and, on the other hand, is absorbed by this and then radiated in the opposite direction to the energy source in relation to the glazing.

These sunshield glazing units are generally assembled as double glazing units, in which the glass sheet bearing the lamination structure is joined to another glass sheet, with or without a coating, with the multilayer lamination structure located inside the space between the two glass sheets.

In some cases, it is often necessary to subject the glazing to a mechanical strengthening operation such as a thermal toughening of the glass sheet or sheets in order to improve its resistance to mechanical stresses. In the production process and shaping process of the glazing units there are some advantages in conducting these toughening operations on the already coated substrate instead of coating a substrate that has already been treated. These operations are conducted at a relatively elevated temperature, i.e. a temperature at which the, e.g. silver-based, infrared reflecting layer tends to deteriorate and lose its optical properties and its properties with respect to infrared radiation. In the case where the coated glass sheet has to undergo a thermal toughening operation, therefore, quite specific precautions must be taken to form a lamination structure that is able to undergo a thermal toughening or bending treatment, often referred to below by the expression "toughenable", without losing its optical and/or energy-related properties, for which it is formed.

It is also desirable that the glazing units meet certain aesthetic criteria in terms of light reflection (LR), i.e. the percentage of incident light flux—of illuminant D65—reflected by the glazing, and reflected and transmitted colour. The market demand is for a glazing with low light reflection. The combination of a high selectivity with a low light reflection sometimes results in the formation of purple tints in reflection, which have very little aesthetic appeal.

To reduce the amount of heat that penetrates into the location through the glazing, the invisible infrared heat radiation is prevented from passing through the glazing by reflecting it. This is the role of the functional layer or layers based on a material that reflects infrared radiation. This is an essential element in a sunshield lamination structure. However, a significant portion of the heat radiation is also transmitted by visible radiation. To reduce the transmission of this portion of the heat radiation and go beyond eliminating the supply of energy by infrared radiation, it is necessary to reduce the level of light transmission.

The solution proposed by patent application WO 02/48065 A1 is to insert an absorbent layer, e.g. of TiN, into the lamination structure and to enclose this layer between two layers of transparent dielectric material. In this way, this document explains, the absorbent layer is not in contact with the glass, which limits the problems associated with the diffusion of oxygen and alkaline substance coming from the glass, in particular under the effect of heat when the glass must undergo thermal treatment, nor is it in direct contact with the silver, which limits the problems of deterioration of the silver layer caused by oxidation of the absorbent layer upon contact, in particular under the effect of the heat.

One of the problems results directly from what has just been stated, and that is that the absorbent layer oxidises in certain conditions, in particular during thermal treatment, and becomes more transparent, thus losing part of the reason for it being included in the lamination. Moreover, the level of oxidation of the absorbent layer will depend on the conditions of the thermal treatment, which means that it will be difficult to retain the properties of the lamination after toughening. To limit this effect, the above-cited document proposes to enclose the absorbent layer between two layers of silicon nitride or aluminium nitride.

In addition to the fact that the result is not completely satisfactory, the solution proposed by this document has the disadvantage of somewhat further complicating the lamination structures that are already complex in nature. In particular, this solution can require the use of a specific deposition zone with adjusted atmosphere right in the middle of a given dielectric to deposit the absorbent layer. Another disadvantage of the solution proposed by this document WO'065 is the difficulty in neutralising the tint provided by the absorbent layer inserted in the middle of a dielectric.

The invention relates to a multilayer sunshield lamination structure formed on a sheet of vitreous material comprising at least one functional layer composed of a silver-based material that reflects infrared radiation and at least two dielectric coatings, one of which is the first dielectric coating deposited directly onto the sheet of vitreous material and the other lies on the outside in relation to the functional layer or layers, each functional layer being surrounded by dielectric coatings, wherein said lamination structure, when deposited on an ordinary clear soda-lime float glass sheet 6 mm thick, has a solar factor SF of less than 45% and a light transmission LT of less than 70%, characterised in that the lamination structure is composed of an essentially metal absorbent material based on at least one of the following elements: Pd, Pt, Au, Ir, Rh, Ru, Os, Co, Ni, Cu, Cr, La, Ce, Pr, Nd, W, Si, Zn, Mo, Mn, Ti, V, Nb, Hf, Ta and alloys thereof arranged in the immediate vicinity of the functional layer or included in this functional layer.

The term "absorbent material" is understood to mean a material that absorbs a portion of the visible radiation, and of which the spectral absorption index $k(\lambda)$ is higher than 1.9 on average, said average being calculated from three points of the visible spectrum located at 380, 580 and 780 nm. Spectral absorption index values are given in "Handbook of Chemistry and Physics", 70th Edition, CRC Press, 1989-1990, E389-E404.

The absorbent material used in the invention is essentially in metal form. It may possibly also be doped with an element not included in the list, such as aluminium or boron, for example, for various reasons, in particular for ease of deposition in a magnetron device or ease of machining the targets.

It is known that silicon should properly be classed as a semimetal, but as silicon behaves like certain metals in various respects, it has been included in the present invention in the term "essentially metal absorbent material" to simplify matters.

The term "immediate vicinity" indicates that the absorbent material forms part of a layer arranged in direct contact with the functional layer or possibly separated from this by a very thin layer of sacrificial metal with a tendency to absorb oxygen or metal sub-oxide. Since the absorbent material is located in the immediate vicinity of the functional layer or is included in this functional layer, it can thus have a favourable effect on the reflection of infrared radiation and additionally benefits from the protective measures against oxidation intended for the material reflecting the infrared radiation.

SUMMARY

The invention specifically relates to lamination structures, which, when deposited on an ordinary clear soda-lime float glass sheet 6 mm thick, have a solar factor SF of less than 45%, in particular of 20 to 45%, and a light transmission LT of less than 70%, in particular of 30 to 70%. In these conditions, they preferably have a solar factor SF in the range of between 25 and 40% and a light transmission LT in the range of between 35 and 68%.

It has surprisingly been found when forming a lamination structure according to the invention that the level of absorption of the lamination structure could be easily defined and that this level is readily retained even in particularly harsh conditions such as a thermal treatment of the lamination structure, for example, and this is also achieved while obtaining the desired optical and aesthetic appearance, e.g. an appearance that is neutral in reflection.

The absorbent materials selected play an essential role in achieving this result. At least some of these materials, in particular palladium and platinum, were already known, e.g. from document EP 543077 A1, for their effect of improving the resistance of the lamination to humidity and chemical attacks, either as an alloy with the infrared reflecting layer, particularly silver, or as an alloy with the sacrificial metal layer on silver. However, it concerned the formation of a lamination structure with the highest possible light transmission. The use of these materials to adjust the level of heat absorption in visible radiation is completely new and different from the instruction given thus far. Moreover, these are relatively costly materials, and it is surprising to use these as absorbent material in series production. We have discovered that the invention surprisingly provides truly significant advantages with respect to the adjustment of the solar factor for glazings with a low solar factor of less than 45% in the case of single glazing and a high selectivity. Moreover, the absorbent materials selected can assist marginally in the reflection of infrared radiation.

The dielectric coatings are well known in the field of layers deposited by cathodic sputtering. There are numerous suitable materials and it is not helpful to list them here. These are generally metal oxides, oxynitrides or nitrides. By way of example, the following can be mentioned as some of the most common: $TiO_2$, $SnO_2$, $ZnO$, $Si_3N_4$, $AlN$, $Al_2O_3$, $ZrO_2$, $Nb_2O_5$ and $Bi_2O_3$. With respect to the outside coating, $SnO_2$ is a dielectric material that is particularly well suited if the lamination structure does not have to undergo high-temperature thermal treatment.

The dielectric coating on the outside of the lamination structure preferably includes at least one zinc-tin mixed oxide-based layer containing at least 20% tin and/or a barrier layer to oxygen diffusion with a thickness of more than 5 nm selected from among the following materials: AlN, AlNxOy, $Si_3N_4$, SiOxNy, $SiO_2$, ZrN, SiC, SiOxCy, TaC, TiN, TiNxOy, TiC, CrC, DLC and alloys thereof, and nitrides or oxynitrides of alloys such as SiAlOxNy or SiTixNy. The thus defined outer dielectric benefits stability of the absorbent material in particular when the lamination structure is subjected to different chemical and thermal attacks from outside and in particular during a high-temperature thermal treatment such as bending and/or toughening.

"DLC" is the abbreviation for the well known term "diamond-like carbon", which relates to a carbon-based layer having tetrahedral bonds similar to a diamond.

According to a first aspect of the invention, the absorbent material is preferably included in the functional layer. Advantageously the functional layer contains 1 to 30 atom %, preferably 5 to 20%, of absorbent material as alloy with, or doped with, the silver-based material that reflects infrared radiation. The absorbent material can be deposited by sputtering using a cathode made from an alloy with the material that reflects infrared radiation. For example, a cathode of silver doped or alloyed with a certain quantity, e.g. 1 to 20% and preferably 5 to 20%, of absorbent material such as palladium or platinum, for example, can be used. It is also possible to use two cathodes, e.g. one silver cathode and one palladium cathode, co-sputtered onto the sheet of vitreous material. A functional layer based on the material that reflects infrared radiation is thus formed that at the same time contains the absorbent material.

The functional layer preferably contains 5 to 10% absorbent material. It has been found that this proportion enables a good compromise to be achieved between the level of absorption due to the absorbent material and the infrared reflection properties of the base material of the functional layer.

For example, the functional layer can include at least one of the following elements: Ti, Zn, Mo, Mn, Nb, V or Hf. These elements in particular allow absorbent faults to be generated in the functional layer, and this is beneficial for reducing the solar factor.

Preferably, according to a preferred embodiment of the first aspect of the invention, the absorbent material included in the functional layer is selected from among the following materials: Ni, Cr, NiCr, CoCr, W, Si and NiV. We have in fact found that in this aspect of the invention these materials form a particularly advantageous association with a silver-based material that reflects infrared radiation. These associations in particular form non-toughenable/bendable sunshield lamination structures with a low solar factor that have a tint in reflection and in transmission ranging from neutral to bluish with an aesthetically pleasing appearance. The elements Ni, Cr, NiCr, CoCr, W, Si and NiV, particularly NiCr and CoCr, are advantageously used to form sunshield lamination structures that are bluish-grey in transmission and reflection, which do not have to undergo high-temperature thermal treatment.

Preferably, according to another preferred embodiment of the first aspect of the invention, the absorbent material included in the functional layer is selected from among the following materials: Os, Co, Pd, Pt, Ir, Ru and Rh. These materials are advantageously used to form sunshield lamination structures that are thermally treated. It has been found that they readily retain their absorbent character, and after thermal treatment of the glazing they provide the lamination structure with a pleasing tint in transmission and in reflection.

Nickel and cobalt in particular are magnetic elements that pose some problems in deposition in a magnetron sputtering device. However, they do not pose any problem if used for doping the infrared reflecting material, for example, in a proportion of 5% in silver.

Preferably, according to this first aspect of the invention, the functional layer contains 1 to 30 atom %, advantageously 5 to 20%, of an absorbent material selected from among Pd, Pt, Au, Ir, Rh, Ru, Os, Co, La, Ce, Pr, Nd and alloys thereof, and the outer dielectric coating includes at least one zinc-tin mixed oxide-based layer containing at least 20% tin and/or a barrier layer to the diffusion of oxygen with a thickness of more than 5 nm selected from among the following materials: AlN, AlNxOy, $Si_3N_4$, SiOxNy, $SiO_2$, ZrN, SiC, SiOxCy, TaC, TiN, TiNxOy, TiC, CrC, DLC and alloys thereof, and nitrides or oxynitrides of alloys such as SiAlOxNy or SiTixNy. This feature enables sunshield lamination structures to be obtained that are suitable for undergoing a high-temperature thermal treatment and that retain their absorbent characteristics after thermal treatment.

According to a second aspect of the invention, the absorbent material preferably at least partially forms part of a separate layer from the functional layer deposited under or on it and in direct contact with it. With this arrangement, the risk of any reduction in properties for the reflection of infrared radiation of the functional layer is reduced, in particular in the case of a high proportion of absorbent material.

According to a first preferred embodiment of this second aspect of the invention, the absorbent material is preferably mixed, both by doping or alloying, with a sacrificial metal layer intended for protection of the functional layer from chemical attacks and in particular from oxidation, e.g. a layer of titanium containing about 5 atom % palladium. Once again, this layer can be formed either from a cathode of an alloy of the sacrificial metal with the absorbent material or by co-sputtering from two separate cathodes. The layer of sacrificial metal preferably contains 5 to 20% absorbent material.

According to a second preferred embodiment of the second aspect of the invention, the absorbent material preferably constitutes the major part of the separate layer deposited under or on, and in direct contact with, the functional layer. Thus, the functional layer can be deposited directly onto the absorbent layer or the absorbent layer can be deposited directly onto the functional layer. It has been found that this arrangement was beneficial both from the point of view of the properties given to the lamination structure and with respect to the ease of industrial use. In fact, the absorbent material deposited in metal form is easily integrated into the essentially metal deposition zone of the functional layer without complicating the deposition process. On the other hand, in the case of the absorbent materials cited in the framework of the invention, it is easy to find materials that are compatible with the silver-based material reflecting infrared radiation used.

It has been found, for example, that with the alloy CoCr in the form of a separate absorbent layer deposited onto the functional layer, it is possible to easily obtain a non-toughenable sunshield lamination structure with a low solar factor with an aesthetically acceptable general appearance, in particular that is bluish-grey in transmission and in reflection, is particularly pleasing and meets the requirement of the market.

Preferably, according to the second preferred embodiment of the second aspect of the invention, the absorbent material is selected from among Pd, Pt, Au, Ir, Rh, Ru, Os, Co, La, Pr, Nd and alloys thereof, and the outer dielectric coating includes at least one zinc-tin mixed oxide-based layer containing at least 20% tin and/or a barrier layer to the diffusion of oxygen with a thickness of more than 5 nm selected from among the following materials: AlN, AlNxOy, $Si_3N_4$, SiOxNy, $SiO_2$, ZrN, SiC, SiOxCy, TaC, TiN, TiNxOy, TiC, CrC, DLC and alloys thereof, and nitrides or oxynitrides of alloys such as SiAlOxNy or SiTixNy. The combination of these absorbent materials with an outer dielectric coating thus defined allows the desired absorption level of the sunshield lamination structure to be defined after high-temperature thermal treatment.

Preferably, this separate layer of absorbent material has a physical thickness in the range of between 0.3 and 10 nm, advantageously in the range of between 0.4 and 5 nm, and ideally in the range of between 0.8 and 3 nm. These thickness ranges allow the formation of sunshield glazing units with a low solar factor and high selectivity with a pleasing aesthetic appearance that meets the requirement of the market.

Advantageously, the absorbent material is selected from at least one of the following elements: Pt, Pd, Co, Ir, Ru, Rh, Os, CoCr, Ti and NiCr and alloys thereof. These absorbent materials allow the formation of an efficient sunshield lamination structure with a pleasing aesthetic appearance that meets requirements, particularly when they are arranged in separate layers of the functional layer. The last three elements cited, i.e. CoCr, Ti and NiCr, are more specifically intended for formation of a lamination structure that does not have to undergo high-temperature thermal treatment.

According to either of the two aspects of the invention and any of the embodiments of these aspects of the invention, the absorbent material is preferably palladium. Within the framework of the invention this association with a silver-based functional layer allows the formation of a selective sunshield lamination structure that has high resistance to corrosion and readily retains its absorbent properties.

Preferably, 4 to 35%, advantageously 8 to 22%, of the light absorption of the lamination structure is attributable to the absorbent material. Thus, a solar factor is obtained that is sufficient to form a product that meets the requirement of the market.

Preferably, the first dielectric coating and the outer dielectric coating comprise at least one zinc-tin mixed oxide-based layer containing at least 20% tin. It has been found that this structure strengthens the resistance of the lamination structure to thermal treatment.

Advantageously, the lamination structure contains at least the following sequence of layers in order starting with the sheet of vitreous material:
 a) a first dielectric coating,
 b) a silver-based functional layer, c) an absorbent layer, d) optionally, one or two sacrificial metal layers, possibly sub-oxidised, selected from one or several of the following materials: Ti, Ni, Cr, Nb, Zn, Zr, Al, Ta and alloys thereof, e) an outer dielectric layer.

It has been found that this specific sequence of layers benefits the retention of the absorption properties of the lamination structure, in particular during a thermal treatment.

The optional sacrificial metal layer can be formed from a double layer such as NiCr/Ti, for example. Such a double layer is the subject of patent application WO 03/106363 A2 filed in the name of the applicant and published on 24 Dec. 2003, the contents of which are incorporated herein by reference.

To obtain a high-performance selective sunshield lamination structure, it advantageously comprises at least two functional layers separated by at least one intermediate dielectric coating.

Preferably, the absorbent material is arranged in the immediate vicinity of, or is included in, the functional layer furthest away from the sheet of vitreous material, and the tint is not significantly modified when one absorbent material is replaced by another absorbent material that provides the same level of absorption. The specific arrangement of the absorbent layer, particularly when it is located above the second functional layer or is included in the functional layer, combined with a sound choice of dielectric structure, allows the formation of a lamination structure that is not dependent on the element forming the absorbent material. Consequently, a material that is easier to deposit by cathodic sputtering or a less costly material can be selected more easily without an informed observer being able to readily detect a change in tint by visual observation and without the solar factor being modified by more than one percent. For example, in this case, when the lamination structure does not have to undergo thermal treatment, palladium can be replaced by titanium or by NiCr without any significant change to the tint of the lamination. However, it is of course necessary to adapt the thickness of the absorbent layer or the percentage of absorbent material in the alloy of the absorbent material with the functional layer or the sacrificial layer according to the nature of the absorbent material to obtain the same level of absorption. The substitution of one absorbent material by another absorbent material for reasons of cost, production concerns or other reasons, for example, is facilitated because it is sufficient to adapt the thickness to the level of absorption and the correct tint of the lamination will be directly achieved.

Preferably, the lamination structure contains at least the following sequence of layers in order starting with the sheet of vitreous material:

a) a first dielectric coating, b) a first silver-based functional layer, c) one or two sacrificial metal layers, possibly sub-oxidised, selected from one or several of the following materials: Ti, Ni, Cr, Nb, Zn, Zr, Al, Ta and alloys thereof, d) an intermediate dielectric coating, e) a second silver-based functional layer, f) an absorbent layer, g) optionally, one or two sacrificial metal layers, possibly sub-oxidised, selected from one or several of the following materials: Ti, Ni, Cr, Nb, Zn, Zr, Al, Ta and alloys thereof, h) an outer dielectric layer.

For example, by using a palladium absorbent layer, sacrificial metal layers of sub-oxidised NiCr in the form of NiCrOx and an outer dielectric layer of $Si_3N_4$, a lamination structure can be easily formed, in which the optical properties are not impaired by a high-temperature thermal treatment operation such as toughening and/or bending, i.e. the coated and then toughened glass sheet can be placed next to a glass sheet bearing the same lamination structure, but which has not undergone thermal treatment, because it has the same aesthetic appearance. The absorption capacity of the lamination structure resulting from palladium is not impaired by thermal treatment.

Advantageously, when silver is used as infrared reflecting material, a zinc oxide-based or zinc sub-oxide-based layer, possibly doped with aluminium, for example, is arranged under each silver layer and in direct contact with it. This association is particularly beneficial with respect to the corrosion resistance of the silver.

Preferably, the lamination structure contains at least the following sequence of layers in order starting with the sheet of vitreous material:

a) a first dielectric coating including at least one zinc-tin mixed oxide-based layer, b) a first silver-based functional layer, c) one or two sacrificial metal layers, possibly sub-oxidised, selected from one or several of the following materials: Ti, Ni, Cr, Nb, Zn, Zr, Al, Ta and alloys thereof, d) an intermediate dielectric coating, e) a second silver-based functional layer, f) a palladium-based absorbent layer, g) optionally, one or two sacrificial metal layers, possibly sub-oxidised, selected from one or several of the following materials: Ti, Ni, Cr, Nb, Zn, Zr, Al, Ta and alloys thereof, h) an outer dielectric layer including at least one zinc-tin mixed oxide-based layer.

Advantageously, all the dielectric coatings include a zinc-tin mixed oxide-based layer with approximately 50% tin and zinc, and a zinc-tin mixed oxide-based layer with not more than about 10% tin and at least about 90% zinc, this latter layer being each time arranged closer to the following functional layer that the mixed oxide layer with approximately 50% tin. It has been found that this arrangement allows the formation of a sunshield lamination structure with low solar factor and high selectivity that has excellent corrosion resistance and that easily withstands a high-temperature thermal treatment without losing its absorbent properties or losing its infrared reflection properties. This structure also allows a lamination structure with a neutral tint in reflection to be easily obtained.

The lamination structure is advantageously finished by a protective layer comprising a final thin film of $SiO_2$ or SiC with a thickness of 1.5 to 10 nm. In the case of a lamination structure that is suitable for undergoing a high-temperature thermal treatment, the protective layer is advantageously composed of a thin film of TiN, which oxidises during the thermal treatment to form $TiO_2$, followed by a final film of $SiO_2$ or SiC.

Preferably, the lamination structure is finished by a thin carbon-based protective layer with a thickness of 1.5 to 10 nm. This protective layer, which is deposited by cathodic sputtering from a carbon target in a neutral atmosphere, is highly suitable for protecting the lamination structure during handling, transport and storage before the thermal treatment. With respect to the use of carbon, this protective layer burns during the high-temperature thermal treatment and disappears completely from the finished product.

The invention extends to a glass sheet bearing a lamination structure as defined above.

Preferably, this glass sheet has a tint tested in reflection on the glass side represented by L* in the range of between 30 and 55, advantageously between 40 and 50, a* in the range of between −4 and +3, advantageously between −2.5 and +1.5, and b* in the range of between −4 and −16, advantageously between −6 and −13.

Preferably, this glass sheet was subjected to a toughening and/or bending thermal treatment after deposition of the multilayer lamination structure.

Preferably 4 to 35%, preferably 8 to 22%, of the light absorption of the lamination structure after thermal treatment is attributable to the absorbent material. The invention allows in particular the formation of a glazing after thermal treatment that has a relatively elevated absorption level with an aesthetically pleasing appearance.

The invention also extends to an assembly formed from a first group comprising at least one glass sheet according to the invention, which was subjected to a high-temperature thermal treatment, and a second group comprising at least one glass sheet according to the invention, which was not subjected to thermal treatment, characterised in that the two groups have a similar visual appearance in reflection on the glass side, such that they can be placed together without any significant visual change.

The invention also extends to a multiple glazing, in particular a double glazing, comprising a glass sheet bearing a lamination structure such as defined above, which has or has not undergone a toughening and/or bending thermal treatment after deposition of the multilayer lamination structure.

Preferably, the multiple glazing according to the invention has a solar factor SF in the range of between 15 and 40%, a light transmission of at least 30% and a colour that is relatively neutral in transmission and neutral to slightly bluish in reflection on the side of the glass sheet bearing the lamination structure. Preferably, the multiple glazing according to the invention has a solar factor SF in the range of between 20 and 35%, advantageously between 25 and 35%, with a light transmission of at least 45%, advantageously at least 50% and ideally at least 55%. This multiple glazing has particularly beneficial sunshield properties in relation to its relatively high light transmission, while still having an aesthetic appearance that enables it to be easily integrated into an architectural assembly.

Preferably, the multiple glazing has a tint in reflection on the side of the glass sheet bearing the laminated structure, wherein the lamination structure is arranged towards the interior space of the multiple glazing, represented by L* in the range of between 40 and 55, preferably between 45 and 52, a* in the range of between 1.5 and −6, preferably between 0.5 and −4, and b* in the range of between −3 and −15, preferably between −5 and −12.

DETAILED DESCRIPTION

The invention will now be described in more detail in a non-restrictive manner by means of the following preferred exemplary embodiments:

EXAMPLES

Example 1

A 2 m by 1 m 6 mm thick sheet of standard clear soda-lime float glass is placed in a magnetron-type sputtering device operated with the aid of a magnetic field at reduced pressure (about 0.3 Pa). A multilayer sunshield lamination structure is deposited on this glass sheet comprising in sequence:

a) a first dielectric coating formed from two oxide layers deposited in a reactive atmosphere formed from a mixture of argon and oxygen from zinc-tin alloy cathodes of different compositions. The first zinc-tin mixed oxide with a thickness of about 30 nm is formed from cathodes of a zinc-tin alloy with 52% by weight of zinc and 48% by weight of tin to form the spinel structure of zinc stannate $Zn_2SnO_4$. The second zinc-tin mixed oxide $ZnSnO_x$ with a thickness of about 10 nm is deposited from targets of a zinc-tin alloy with 90% by weight of zinc and 10% by weight of tin.

b) A first infrared reflecting functional layer formed from about 11 nm of silver from a target of practically pure silver in a neutral atmosphere of argon.

c) A first double sacrificial metal layer formed from a first layer of NiCr with a thickness of 1 nm deposited from a target of an alloy with 80% Ni and 20% Cr, and a second layer of Ti with a thickness of 2.5 nm deposited from a titanium target. These layers are both deposited in a flux of argon lightly contaminated with oxygen from the adjacent chambers. It should be noted that the oxidising atmosphere of the plasma during deposition of the following layer, described below, completely oxidises the layer of titanium such that at the end of the deposition process of the second dielectric the titanium is virtually fully oxidised to form a compact layer of $TiO_2$. As a variant, it is also possible to deposit the layer in the form of partially oxidised TiOx. This layer can also be deposited, for example, from a TiOx ceramic target in an atmosphere of Ar containing a small proportion of oxygen intended to maintain a sufficient oxidation level of the TiOx for it to be transparent. It can also be oxidised by the plasma used for deposition of the following layer.

d) A second dielectric coating formed from two layers of zinc-tin mixed oxides deposited in a reactive atmosphere formed from a mixture of oxygen and argon from cathodes of zinc-tin alloys of different compositions. The first zinc-tin mixed oxide with a thickness of about 77 nm is deposited from metal targets of an alloy of ZnSn with 52% Zn and 48% Sn (by weight) to form the spinel structure of zinc stannate $Zn_2SnO_4$. The second zinc-tin mixed oxide $ZnSnO_x$ with a thickness of about 13 nm is deposited from targets of an alloy of ZnSn with 90% Zn and 10% Sn (by weight).

e) A second infrared reflecting functional layer formed by about 18 nm of silver from a target of practically pure silver in a neutral atmosphere of argon.

f) A layer of absorbent material formed by about 1 nm of palladium from a palladium target in the same neutral atmosphere of argon as layer e).

g) A second double sacrificial metal layer formed from a first layer of 1 nm of NiCr covered by a second layer of 2.5 nm of Ti in the same way as for the first double sacrificial metal layer described above.

h) A third dielectric coating, the outer dielectric coating, formed from two layers of oxides deposited in a reactive atmosphere formed by a mixture of oxygen and argon from cathodes of zinc-tin alloys of different compositions. The first zinc-tin mixed oxide $ZnSnO_x$ with a thickness of about 7 nm is deposited from metal targets of an alloy of ZnSn with 90% Zn and 10% Sn (by weight). The second zinc-tin mixed oxide with a thickness of about 17 nm is deposited from targets of an alloy of ZnSn with 52% Zn and 48% Sn (by weight) to form the spinel structure of zinc stannate $Zn_2SnO_4$.

i) The lamination structure is then finished by the deposition of a 5 nm thick upper protective layer of TiN deposited in an atmosphere of nitrogen from a titanium target.

It should be noted that all the layers of $ZnSnO_x$ are sufficiently oxidised to be as transparent as possible. It should also be noted that the thicknesses of Ti, TiOx and TiN are given as equivalent thickness of $TiO_2$ (i.e. as a result of the oxidation of Ti, TiOx or TiN), which is their state in the finished product after thermal treatment, and is already the state even in the intermediate glazing that is suitable for a thermal treatment with respect to Ti.

When the glass sheet freshly coated by the multilayer sunshield lamination leaves the layer deposition device it has the following properties:

LT=51.1%; SF=32.5% ϵ (emissivity)=0.025; absorption=34.5%, of which about 10% is attributable to the palladium layer of absorbent material;
the tint in transmission is expressed by the following values:
L*=71.5; a*=−3.9; b*=+3.5
the tint in reflection on the glass side is expressed by the following values:
LR=14.5%; L*=45.5; a*=−10.0; b*=−15.8; $\lambda_d$=478 nm; purity=30.7%.

In the present invention, the following collective terms are used for the measured or calculated values. Light transmission (LT), light reflection (LR), light absorption (LA) (percentage of light flux—of illuminant D65—absorbed by the glazing) and tint in transmission (1976 CIELAB values L*a*b*) are measured with illuminant D65/2°. With respect to the tint in reflection, the 1976 CIELAB values (L*a*b*) as well as the dominant wavelength ($\lambda_d$) and the purity (p) are measured with illuminant D65/10°. The solar factor (SF or g) is calculated in accordance with standard EN410. The value U (coefficient k) and emissivity (ϵ) are calculated in accordance with standards EN673 and ISO 10292.

The coated glazing with the multilayer sunshield lamination formed on the glass sheet then undergoes a thermal toughening operation, during which it is exposed to a temperature of 690° C. for 6 minutes and then cooled suddenly by jets of cold air. During this thermal treatment, the thin films of NiCr of the barrier layers are oxidised sufficiently to be transparent while also forming an effective and stable screen to protect the silver layers. The upper protective layer of TiN is itself oxidised to form $TiO_2$.

After this treatment, the coated and toughened glazing has the following properties:

LT=68.1%; ϵ (emissivity)=0.023; Rs=1.6 Ω/sq.; absorption=21.2%, of which about 10% is attributable to the palladium layer of absorbent material;
the tint in transmission is expressed by the following values:
L*=86.1; a*=−2.0; b*=+1.2; haze=0.09%;
and the tint in reflection on the glass side is expressed by the following values:
LR=10.6%; L*=39.3; a*=−2.1; b*=−12.1; $\lambda_D$=474 nm; p=22.1%.

The haze value is defined as being the ratio of the diffuse light transmission to the total light transmission multiplied by 100 to obtain a % value. This value is measured in accordance with standard ASTM D1003.

It was found that the absorption value due to the absorbent layer did not decrease following the high-temperature thermal treatment.

This coated glazing is then assembled as double glazing with another 6 mm clear glass sheet, wherein the coating is arranged on the side of the inside space of the double glazing. The space between the two sheets is 15 mm and the air therein is replaced by argon. When looking at the double glazing on the glass side of the coated glazing with lamination structure placed in position 2, i.e. when viewed from the glass side, the glazing provided with the lamination structure is seen first and then the clear glass sheet without a layer, the following properties are noted:
LT=61.7%; LR=14.4%; SF=36.5%; S=1.7 value U=1.05 W/(m²·K);
the tint in transmission is expressed by the following values:
L*=82.8; a*=−2.9; b*=+1.4
the tint in reflection is expressed by the following values:
L*=45.0; a*=−2.5; b*=−9.9; $\lambda_D$=475 nm; p=17.1%.

Visual examination in reflection of the double glazing shows a uniform tint and appearance over the entire surface. The invention allows the formation of a double glazing with a low solar factor, which retains an adequate light transmission and has a very high aesthetic appeal.

Example 2

Example No. 2 is performed in the same way as Example 1, but with a different lamination structure. In this example the following sequence is used:

a) a first dielectric coating formed from two oxide layers deposited in a reactive atmosphere formed from a mixture of argon and oxygen from zinc-tin alloy cathodes of different compositions. The first zinc-tin mixed oxide with a thickness of about 24 nm is formed from cathodes of a zinc-tin alloy with 52% by weight of zinc and 48% by weight of tin to form the spinel structure of zinc stannate $Zn_2SnO_4$. The second zinc-tin mixed oxide $ZnSnO_x$ with a thickness of about 8 nm is deposited from targets of a zinc-tin alloy with 90% by weight of zinc and 10% by weight of tin.

b) A first infrared reflecting functional layer formed from about 9 nm of silver from a target of practically pure silver in a neutral atmosphere of argon.

c) A first sacrificial metal layer formed from a layer of Ti with a thickness of 5 nm deposited from a titanium target. This layer is deposited in a flux of argon lightly contaminated with oxygen from the adjacent chambers. It should be noted that the oxidising atmosphere of the plasma during deposition of the following layer, described below, only partially oxidises this layer of titanium.

d) A second dielectric coating formed from two layers of zinc-tin mixed oxides deposited in a reactive atmosphere formed from a mixture of oxygen and argon from cathodes of zinc-tin alloys of different compositions. The first zinc-tin mixed oxide with a thickness of about 65 nm is deposited from metal targets of an alloy of ZnSn with 52% Zn and 48% Sn (by weight) to form the spinel structure of zinc stannate $Zn_2SnO_4$. The second zinc-tin mixed oxide $ZnSnO_x$ with a thickness of about 10 nm is deposited from targets of an alloy of ZnSn with 90% Zn and 10% Sn (by weight).

e) A second infrared reflecting functional layer formed by about 15 nm of silver from a target of practically pure silver in a neutral atmosphere of argon.

f) A layer of absorbent material formed by about 1.8 nm of palladium from a palladium target in the same neutral atmosphere of argon as layer e).

g) A second sacrificial metal layer formed from a layer of 2.5 nm of Ti in the same way as for the first sacrificial metal layer described above, which will be oxidised by the atmosphere of the plasma for deposition of the following dielectric layer.

h) A third dielectric coating, the outer dielectric coating, formed from two layers of oxides deposited in a reactive atmosphere formed by a mixture of oxygen and argon from cathodes of zinc-tin alloys of different compositions. The first zinc-tin mixed oxide $ZnSnO_x$ with a thickness of about 7 nm is deposited from metal targets of an alloy of ZnSn with 90% Zn and 10% Sn (by weight). The second zinc-tin mixed oxide with a thickness of about 15 nm is deposited from targets of an alloy of ZnSn with 52% Zn and 48% Sn (by weight) to form the spinel structure of zinc stannate $Zn_2SnO_4$.

i) The lamination structure is then finished by the deposition of a 5 nm thick upper protective layer of TiN deposited in an atmosphere of nitrogen from a titanium target.

It should be noted that the thicknesses of Ti are given as equivalent thickness of $TiO_2$ (i.e. as a result of the oxidation of Ti), which is their state in the finished product after thermal treatment. Moreover, for layer g) the Ti is already in its oxidised state in the intermediate glazing that is suitable to undergo a thermal treatment.

When the glass sheet freshly coated by the multilayer sunshield lamination leaves the layer deposition device it has the following properties:

LT=19.7%; SF=26.4% $\epsilon$ (emissivity)=0.030; absorption=67.4%, of which about 20% is attributable to the palladium layer of absorbent material;

the tint in transmission is expressed by the following values:
L*=51.4; a*=−6.1; b*=−6.8
the tint in reflection on the glass side is expressed by the following values:
LR=12.9%; L*=42.7; a*=−5.8; b*=−31.9; $\lambda_d$=480 nm; purity=49.9%.

The coated glazing with the multilayer sunshield lamination formed on the glass sheet then undergoes a thermal toughening operation, during which it is exposed to a temperature of 690° C. for 6 minutes and then cooled suddenly by jets of cold air. During this thermal treatment, the titanium is still in metal form, in particular within the first sacrificial metal layer c), it is oxidised sufficiently to be transparent while still forming an effective and stable screen to protect the underlying silver layer. The upper protective layer of Ti is itself oxidised to form a transparent upper protective layer of $TiO_2$.

After this treatment, the coated and toughened glazing has the following properties:

LT=59.1%; $\epsilon$ (emissivity)=0.026; Rs=1.8 $\Omega$/sq.; absorption=31.0%, of which about 20% is attributable to the palladium layer of absorbent material;

the tint in transmission is expressed by the following values:
L*=81.3; a*=−3.0; b*=−5.0; haze=0.12%;
and the tint in reflection on the glass side is expressed by the following values:
LR=9.9%; L*=37.6; a*=−0.1; b*=−5.6; $\lambda_D$=477 nm; p=9.6%.

It was found that the absorption value due to the absorbent layer did not decrease following the high-temperature thermal treatment.

This coated glazing is then assembled as double glazing with another 6 mm clear glass sheet, wherein the coating is arranged on the side of the inside space of the double glazing. The space between the two sheets is 15 mm and the air therein is replaced by argon. When looking at the double glazing on the glass side of the coated glazing with the lamination structure placed in position 2, i.e. when viewed from the glass side, the glazing provided with the lamination structure is seen first and then the clear glass sheet without a layer, the following properties are noted:

LT=53.0%; LR=12.7%; SF=29.9%; S=1.78 value U=1.1 W/(m²·K);
the tint in transmission is expressed by the following values:
L*=77.9; a*=−4.1; b*=−4.0
the tint in reflection is expressed by the following values:
L*=42.3; a*=−0.9; b*=−6.1; $\lambda_D$=480 nm; p=15.6%.

Visual examination in reflection of the double glazing shows a uniform tint and appearance over the entire surface. The invention allows the formation of a double glazing with a very low solar factor, which retains an adequate light transmission and has a very high aesthetic appeal Examples 3 to 15

Unless otherwise indicated, the following Examples 3 to 15 are conducted in a similar manner to Example 1 above but with different structures. The structures of the corresponding laminations are given in the following Table 1 with the following explanation of the abbreviations used:

D1=the first dielectric coating formed from two or three oxide or nitride or possibly oxynitride layers. The nitride layers are deposited in a reactive mixture of nitrogen and argon from a metal target. This applies to the other dielectrics of the lamination structure, where applicable. The $Si_3N_4$ layers used in the examples can be lightly oxidised in the form of SiOxNy. It should be noted that the $Si_3N_4$ and ZnO layers can be doped with aluminium in the well known manner.

D2=the intermediate dielectric coating formed, if present in the example, from oxide or nitride or possibly oxynitride layers like D1.

D3=the outer dielectric coating formed from one or two oxide or nitride or possibly oxynitride layers like D1.

IR1 and IR2=the first and second infrared reflecting functional layers.

P1 and P2=the first and second sacrificial metal layers each formed from one or two layers of metal or metal alloy in metal or possibly sub-oxidised form. These layers are intended to protect the infrared reflecting material (IR1 and IR2), such as silver, from oxidation by oxidising in its place, in particular during deposition of the subsequent layers or during the thermal treatment of the layer, if this occurs. In the final product they would preferably be virtually fully oxidised.

Table 1 shows the state of the layers when they leave the sputtering device before any thermal treatment, i.e. the sacrificial metal layers have already been oxidised by the plasma for deposition of the following layers, if such is the case. In this case, they are represented by their oxidised state and not in the form in which they have been deposited. For example, $TiO_2$, ZAlO5 and $Nb_2O_5$ of columns P1 and/or P2 of Examples 3 to 7 and 11 to 15 were deposited in metal form and oxidised during deposition of the following oxide and no longer constitute a reserve for oxidation for any subsequent treatment. In contrast, NiCrOx and TiOx of Examples 9, 10 and 13 are deposited in sub-oxidised form and remain sub-oxidised at the end of the deposition process so that they do constitute a reserve for oxidation for any subsequent treatment. NiCrOx (Examples 9 and 13) is deposited from a cathode of NiCr in a lightly oxidising reactive atmosphere with a control loop of the oxidation state, while TiOx (Example 10) is deposited from a ceramic TiOx cathode in an atmosphere substantially made up of argon. Within the framework of the invention, it would also be possible to deposit TiOx in the same way as NiCrOx. In Example 15 (in P1), TiOx is also deposited from a ceramic TiOx cathode in an atmosphere substantially made up of argon, with a low proportion of oxygen, and is in a strongly oxidised state after deposition of the following oxide (ZSO5).

NiCr (P1, Example 4) is a metal alloy with 80% by weight of nickel and 20% by weight of chromium used as sacrificial metal. NiV (P1 and P2, Example 6) is a metal alloy with 93% by weight of nickel and 7% by weight of vanadium also used as sacrificial metal. In these examples, both (NiCr and NiV) form a reserve for oxidation for the subsequent high-temperature thermal treatment operation. After thermal treatment they are oxidised. In the case of TiRu15 of Example 8, Ti forms a reserve for oxidation for the subsequent thermal treatment operation, while Ru is the absorbent material that remains in absorbent metal form after thermal treatment.

CS=upper protective layer, possibly formed from two layers.

AB=absorbent layer if the absorbent material is deposited in the form of a separate layer.

If not, the absorbent material is present in the form of an alloy, or in doped form with the infrared reflecting material and/or with the sacrificial metal. In Table 1, the absorbent material is shown is bold characters. The number indicated to the side of the absorbent material indicates the atomic percentage of this material in the alloy with the material of the functional layer or the sacrificial metal. Ag:Pd3, for example, signifies that there is 3 atom. % of absorbent palladium in the silver and the same applies accordingly for Ag:Pd2, Ag:Pd30, Ag:Co5, Ag:Os11 and Ag:Au8. Moreover, TiRu15 indicates that there is 15 atom. % of absorbent ruthenium in the alloy with the sacrificial metal Ti; and so on. Ag:NiCr10 indicates that there is 10 atom. % of the alloy NiCr (alloy with 80% by weight of Ni and 20% by weight of Cr) in the silver. This functional layer containing the absorbent material can be deposited by co-sputtering from a silver cathode and an NiCr cathode or it can be obtained from a single cathode of an AgNiCr alloy.

As a variant of Example 12, Ag:NiV10 has been used with 10 atom. % of NiV (alloy with 93% by weight of Ni and 7% by weight of vanadium) in the silver and the same results as those listed above were obtained.

CoCr is an alloy with 80% by weight of Co and 20% by weight of Cr. This alloy can be deposited by magnetron without any problem associated with the fact that the CoCr is not ferromagnetic, as in the case of NiCr or NiV mentioned above, on the contrary, with pure Co and pure Ni.

ZSO5=zinc tin mixed oxide obtained by cathodic sputtering in an oxidising atmosphere from a metal target of an alloy of ZnSn with 52% Zn and 48% Sn;

ZSO9=zinc tin mixed oxide obtained by cathodic sputtering in an oxidising atmosphere from a metal target of an alloy of ZnSn with 90% Zn and 10% Sn;

ZAlO2 or ZAlO5=zinc oxide ZnO containing 2 or 5 atom. % of aluminium Al respectively.

TABLE 1

| Ex. | D1 (nm) | | AB (nm) | IR1 (nm) | AB (nm) | P1 (nm) | | D2 (nm) | | AB (nm) |
|---|---|---|---|---|---|---|---|---|---|---|
| 3 | ZSO5 (25) | ZSO9 (12) | — | Ag (24) | Pt (0.4) | ZAlO5 (2) | | — | | — |
| 4 | Si$_3$N$_4$ (26) | ZAlO5 (11) | — | Ag: Pd30 (18) | — | NiCr (1.2) | TiO$_2$ (2.5) | ZSO5 (71) | ZSO9 (11) | — |
| 5 | ZSO5 (29) | ZSO9 (7) | — | Ag: Co5 (10) | — | Cr (2) | TiO$_2$ (2.5) | ZSO5 (75) | ZSO9 (9) | — |
| 6 | ZSO5 (24) | ZSO9 (10) | — | Ag (9) | — | NiV (1) | TiO$_2$ (2.5) | ZSO5 (77) | ZSO9 (10) | Ir (0.9) |
| 7 | ZSO5 (28) | ZSO9 (9) | Pt (4.8) | Ag (18) | — | Ti (3) | TiO$_2$ (3) | ZSO5 (71) | ZSO9 (11) | — |
| 8 | TiO$_2$ (16) | NiCrO (6) | TiO$_2$ (6) | — | | Ag (11) | | TiRu15 (6) | | Si$_3$N$_4$ (51) | TiO$_2$ (20) | — |
| 9 | Si$_3$N$_4$ (34) | ZAlO5 (8) | Pd (1) | Ag: Pd3 (21) | — | NiCrOx (6) | | Si$_3$N$_4$ (68) | ZAlO5 (10) | — |
| 10 | ZSO5 (39) | ZSO9 (9) | — | Ag: Os11 (17) | — | TiOx (6) | | Si$_3$N$_4$ (71) | ZAlO2 (11) | — |
| 11 | SnO$_2$ (25) | ZnO (9) | — | Ag (18) | CoCr (1.5) | TiO$_2$ (2.5) | | — | | — |
| 12 | TiO$_2$ (10) | ZnO (15) | — | Ag (10) | — | Nb$_2$O$_5$ (2.5) | | SnO$_2$ (64) | ZnO (22) | — |
| 13 | Si$_3$N$_4$ (20) | ZAlO2 (6) | — | Ag (10) | — | NiCrOx (5) | | ZSO5 (70) | ZSO9 (9) | Pd (1.5) |
| 14 | ZSO5 (29) | ZSO9 (6) | — | Ag (13) | — | Ti (3) | TiO$_2$ (3) | ZSO5 (58) | ZSO9 (20) | — |
| 15 | SnO$_2$ (16) | ZnO (20) | — | Ag (10) | — | TiOx (12) | | ZSO5 (35) | ZnO (39) | — |

| Ex. | IR2 (nm) | AB (nm) | P2 (nm) | | D3 (nm) | | CS (nm) | |
|---|---|---|---|---|---|---|---|---|
| 3 | — | — | — | | ZAlO5 (10) | ZSO5 (37) | TiO$_2$ (5) | Si$_3$N$_4$ (1.5) |
| 4 | Ag (14) | — | Ti (3) | TiO$_2$ (3) | SiO$_2$ (32) | | — | |
| 5 | Ag: Co5 (16) | — | Cr (2) | TiO$_2$ (3) | ZSO9 (7) | ZSO5 (20) | Ti (3) | |
| 6 | Ag (17) | — | NiV (1) | TiO$_2$ (2.5) | ZSO9 (6) | ZSO5 (18) | TiN (2) | SiO$_2$ (2) |
| 7 | Ag (14) | — | Ti (3) | TiO$_2$ (3) | SiO$_2$ (30) | | — | |
| 8 | Ag (14) | — | TiRu15 (6) | | SiO$_2$ (6) | Si$_3$N$_4$ (30) | — | |
| 9 | Ag: Pd2 (26) | Pd (0.8) | NiCrOx (6) | | ZAlO5 (7) | Si$_3$N$_4$ (18) | — | |
| 10 | Ag: Os11 (16) | — | TiOx (6) | | SiO$_2$ (30) | | — | |
| 11 | — | — | — | | ZnO (18) | ZSO5 (12) | SnO$_2$ (20) | |

TABLE 1-continued

| | | | | | | | | | | | |
|---|---|---|---|---|---|---|---|---|---|---|---|
| 12 | Ag: NiCr10 (17) | — | Nb$_2$O$_5$ (3) | | | ZnO (13) | | | SnO$_2$ (18) | | |
| 13 | Ag (20) | — | Ti (3) | TiO$_2$ (3) | ZSO9 (7) | | ZSO5 (24) | TiN (5) | C (5) | | |
| 14 | Ag—Au8 (20) | — | Ti (3) | TiO$_2$ (3) | | ZSO5 (20) | | TiN (3) | SiC (5) | | |
| 15 | Ag (20) | Pd (1.2) | TiO$_2$ (2) | | ZnO (12) | ZSO5 (10) | SnO$_2$ (10) | — | | | |

The glass sheets of Examples 3 to 15 have a thickness of 6 mm.

The glazings coated with the laminations according to Examples 3 to 10 and 13-14 were then subjected to a thermal toughening operation, during which they were exposed to a temperature of 690° C. for 6 minutes and then cooled suddenly by jets of cold air.

The optical and energy-related properties of the coated glazings after toughening, if this has occurred, (Examples 3 to 10 and 13-14), or after coating if they have not been thermally treated (Examples 11, 12 and 15) are given in Table 2.

The values given for Examples 3 to 8 and 13-14 are values after thermal treatment.

For Examples 9 and 10, the values before thermal treatment are also given (Tables 2 and 3) in a line marked in italics BT (before toughening). It has been found for these two examples that the properties did not change significantly following the toughening treatment and that the toughened versions can therefore be placed together with their homologous non-toughened versions.

In Examples 3 to 10 and 13-14, it is noted that the coated glazings are absorbent after toughening and that emissivity is low.

Examples 11, 12 and 15 are non-toughenable laminations, i.e. they are used as such without undergoing thermal treatment. The values given in Table 2 for examples 11, 12 and 15 are therefore the values measured on leaving the layer deposition device or after storage without thermal treatment.

$L_{RV}^*$, $a_{RV}^*$, $b_{RV}^*$ represent the 1976 CIELAB values of the tint in reflection on the glass side.

$\lambda_{d(RV)}$ and $p_{(RV)}$ represent the dominant wavelength and the purity of the tint in reflection on the glass side.

$\Delta E^* = \sqrt{(\Delta L^*)^2 + (\Delta a^*)^2 + (\Delta b^*)^2}$ represents the variation in tint during the thermal treatment.

The amount of light absorption due to the absorbent material in the different examples is respectively about 4% for Example 3, about 30% for Example 4, about 11% for Example 5, about 10% for Example 6, about 32% for Example 7, about 18% for Example 8, about 28% for Example 9, about 22% for Example 10, about 4% for Example 11, about 9% for Example 12, about 21% for Example 13, about 20% for Example 14 and about 17% for Example 15. This value of light absorption due to the absorbent material in the lamination structure was not modified by the high-temperature thermal treatment, which the lamination structures of Example 3 to 10 and 13-14 were subjected to.

As a variant of Example 12, the absorbent material NiCr, which is present as alloy with 10 atom % of NiCr in the silver of the second functional layer, has been replaced by 10 atom % of Ti in the silver or by 4 atom % of Pd in the silver, without changing the thickness of the functional layer (IR2), and the same optical properties including tint were obtained as the values given in Table 2 for Example 12. Example 12 and its variants relate to non-toughenable lamination structures. When a toughenable lamination structure is concerned, the substitution absorbent material must be selected from the absorbent materials listed above as preferred for the formation of toughenable lamination structures, i.e. the following materials: Pd, Pt, Au, Ir, Rh, Ru, Os, Co, La, Ce, Pr, Nd and alloys thereof.

The optical and energy-related properties of the coated glazings assembled as double glazing in the same manner as in Example 1 with a clear glass sheet of 6 mm and with a space of 15 mm filled with 100% argon are given in Table 3. The glazing is observed with the lamination located in position 2 on the outer sheet inside the double glazing, i.e. when viewed from the glass side, the glazing provided with the lamination structure is seen first and then the clear glass sheet without a layer. The double glazings of Examples 9 and 10 assembled with toughened lamination structures can be aesthetically placed together with their homologous assemblies with the same non-toughenable lamination structures, because $\Delta E^*$ is very low.

TABLE 2

| Ex. | LT (%) | LR (%) | LA (%) | SF (%) | ε | $L_{RV}^*$ | $a_{RV}^*$ | $b_{RV}^*$ | $\lambda_{d(RV)}$ (nm) | $P_{(RV)}$ (%) | $\Delta E^*$ |
|---|---|---|---|---|---|---|---|---|---|---|---|
| 3 | 47.7 | 43.7 | 8.6 | 31.3 | 0.03 | 72.2 | −2.3 | −3.3 | 479 | 4.7 | — |
| 4 | 42.5 | 14.8 | 42.8 | 27.5 | 0.03 | 45.5 | −0.9 | −8.1 | 473 | 13.1 | — |
| 5 | 67.8 | 11.0 | 21.3 | 40.5 | 0.03 | 39.8 | −1.9 | −10.4 | 474 | 18.8 | — |
| 6 | 67.6 | 11.2 | 21.3 | 43.0 | 0.02 | 41.0 | −2.7 | −10.3 | 474 | 19.1 | — |
| 7 | 43.1 | 14.5 | 42.5 | 27.5 | 0.04 | 45.1 | −1.6 | −7.3 | 474 | 12.5 | — |
| 8 | 60.8 | 10.5 | 28.7 | 37.5 | 0.03 | 39.2 | −1.8 | −12.9 | 473 | 23.4 | — |
| 9 BT | 33.9 | 27.0 | 39.1 | 22.7 | 0.04 | 59.0 | −1.5 | −2.0 | 479 | 3.5 | 1.00 |
| 9 | 34.2 | 27.7 | 38.0 | 23.2 | 0.04 | 59.7 | −2.2 | −2.2 | 480 | 4.1 | |
| 10 BT | 56.5 | 11.4 | 32.1 | 33.6 | 0.04 | 40.2 | 0.2 | −14.9 | 471 | 24.6 | 1.05 |
| 10 | 57.6 | 10.8 | 31.6 | 34.0 | 0.03 | 39.6 | 0.7 | −15.6 | 470 | 25.7 | |
| 11 | 58.7 | 32.1 | 9.2 | 40.2 | 0.04 | 63.7 | −3.0 | −6.3 | 477 | 9.2 | — |
| 12 | 68.6 | 11.0 | 20.4 | 42.5 | 0.03 | 39.8 | −1.3 | −10.4 | 473 | 18.7 | |
| 13 | 55.6 | 13.5 | 31.0 | 34.8 | 0.02 | 43.8 | −2.3 | −10.4 | 474 | 18.0 | |
| 14 | 56.5 | 13.1 | 30.4 | 34.0 | 0.02 | 43.2 | −0.3 | −9.8 | 478 | 16.0 | |
| 15 | 55.5 | 16.8 | 27.7 | 37.1 | 0.03 | 48.4 | 0.0 | −13.1 | 470 | 19.7 | |

TABLE 3

| Ex. | LT (%) | LR (%) | LA (%) | SF (%) | S | U (or k) (W/m²K) | $L_{RV}^*$ | $a_{RV}^*$ | $b_{RV}^*$ | $\lambda_{d(RV)}$ (nm) | $P_{(RV)}$ (%) | $\Delta E^*$ |
|---|---|---|---|---|---|---|---|---|---|---|---|---|
| 3 | 43.7 | 45.5 | 10.7 | 27.7 | 1.58 | 1.1 | 73.4 | −2.4 | −2.7 | 480 | 4.2 | — |
| 4 | 38.1 | 16.2 | 45.7 | 21.2 | 1.80 | 1.1 | 47.4 | −1.8 | −7.4 | 474 | 12.3 | — |
| 5 | 60.6 | 14.6 | 24.7 | 34.5 | 1.76 | 1.1 | 45.3 | −3.1 | −8.1 | 476 | 14.6 | — |
| 6 | 61.7 | 14.4 | 23.9 | 37.0 | 1.67 | 1.1 | 45.0 | −2.5 | −9.9 | 475 | 17.1 | — |
| 7 | 38.6 | 16.0 | 45.4 | 53.0 | 1.82 | 1.1 | 47.1 | −2.5 | −6.5 | 476 | 11.5 | — |
| 8 | 54.7 | 14.2 | 31.1 | 31.3 | 1.75 | 1.1 | 44.8 | −2.0 | −10.8 | 474 | 18.2 | — |
| 9 BT | 31.1 | 27.9 | 41.0 | 17.3 | 1.79 | 1.1 | 59.8 | −1.6 | −2.0 | 479 | 3.4 | 1.06 |
| 9 | 31.2 | 28.7 | 40.1 | 17.8 | 1.75 | 1.1 | 60.5 | −2.4 | −2.1 | 481 | 4.0 | |
| 10 BT | 50.7 | 13.8 | 35.5 | 27.2 | 1.86 | 1.1 | 44.0 | −1.2 | −12.0 | 469 | 18.2 | 0.91 |
| 10 | 51.5 | 13.4 | 35.1 | 27.6 | 1.87 | 1.1 | 43.7 | −0.7 | −12.7 | 472 | 20.5 | |
| 11 | 53.2 | 34.9 | 11.8 | 28.6 | 1.50 | 1.1 | 65.9 | −3.1 | −5.2 | 478 | 7.8 | |
| 12 | 61.4 | 14.8 | 23.8 | 36.4 | 1.69 | 1.1 | 45.5 | −2.5 | −8.2 | 475 | 14.3 | |
| 13 | 50.0 | 15.9 | 34.1 | 29.4 | 1.70 | 1.0 | 47.2 | −3.1 | −9.0 | 475 | 15.8 | |
| 14 | 50.8 | 15.7 | 33.5 | 28.2 | 1.81 | 1.0 | 47.0 | −2.0 | −8.7 | 474 | 14.6 | |
| 15 | 49.8 | 19.3 | 30.9 | 29.2 | 1.71 | 1.1 | 51.4 | −1.1 | −11.7 | 473 | 16.9 | |

The invention claimed is:

1. A multilayer sunshield lamination structure formed on a sheet of vitreous material comprising:
    at least one functional layer composed of a silver-based material that reflects infrared radiation;
    at least two dielectric coatings, one of which is the first dielectric coating deposited directly onto the sheet of vitreous material and the other lies on the outside in relation to the functional layer or layers, each functional layer being surrounded by dielectric coatings; and
    an essentially metal absorbent material based on at least one of the following elements selected from the group consisting of: Rh, Ru, Os, Co, La, Ce, Pr, Nd, Mo, Mn, Hf, and alloys thereof forming at least part of a separate layer from the functional layer and deposited under or on, and in direct contact with, the functional layer,
    wherein said lamination structure, when deposited on an ordinary clear soda-lime float glass sheet 6 mm thick, has a solar factor SF of less than 45% and a light transmission LT of less than 70%.

2. The lamination structure according to claim 1, wherein an outermost dielectric coating of the lamination structure includes at least one zinc-tin mixed oxide-based layer containing at least 20% tin and/or a barrier layer to oxygen diffusion with a thickness of more than 5 nm selected from the group consisting of: AlN AlNxOy, $Si_3N_4$, SiOxNy, $SiO_2$, ZrN, SiC, SiOxCy, TaC, TiN, TiNxOy, TiC, CrC, DLC and alloys thereof, and nitrides or oxynitrides of alloys such as SiAlOxNy or SiTixNy.

3. The lamination structure according to claim 1, wherein the absorbent material constitutes a major part of said separate layer deposited under or on, and in direct contact with, the functional layer.

4. The lamination structure according to claim 3, wherein said separate layer of absorbent material has a physical thickness in a range of between 0.3 and 10 nm.

5. The lamination structure according to claim 4, wherein said separate layer of absorbent material has a physical thickness in the range of between 0.8 and 3 nm.

6. The lamination structure according to claim 4, wherein said separate layer of absorbent material has a physical thickness in the range of between 0.4 and 5 nm.

7. The lamination structure according to claim 3, wherein the lamination structure comprises at least the following sequence of layers in order starting with the sheet of vitreous material:
    a) a first dielectric coating,
    b) a silver-based functional layer,
    c) an absorbent layer consisting of an essentially metal absorbent material based on at least one of the following elements selected from the group consisting of: Rh, Ru, Os, Co, La, Ce, Pr, Nd, Mo, Mn, Hf, and alloys thereof,
    d) one or two sacrificial metal layers, which may be sub-oxidised, wherein the metal is selected from one or a combination of the following materials from the group consisting of: Ti, Ni, Cr, Nb, Zn, Zr, Al, Ta and alloys thereof, and
    e) an outer dielectric layer.

8. The lamination structure according to claim 1, wherein the absorbent material is selected from at least one of the following elements from the group consisting of: Co, Ru, Rh, Os, CoCr, and alloys thereof.

9. The lamination structure according to claim 1, wherein 4 to 35% of a light absorption of the lamination structure is attributable to the absorbent material.

10. The lamination structure according to claim 9, wherein 8 to 22% of the light absorption of the lamination structure is attributable to the absorbent material.

11. The lamination structure according to claim 1, wherein the first dielectric coating and the outer dielectric coating comprise at least one zinc-tin mixed oxide-based layer containing at least 20% tin.

12. The lamination structure according to claim 1, wherein the lamination structure comprises at least two functional layers separated by at least one intermediate dielectric coating.

13. The lamination structure according to claim 12, wherein the absorbent material is in direct contact with a functional layer furthest away from the sheet of vitreous material, and that a tint is not significantly modified when one absorbent material is replaced by another absorbent material that provides a same level of absorption.

14. The lamination structure according to claim 12, wherein the lamination structure comprises at least the following sequence of layers in order starting with the sheet of vitreous material:
    a) a first dielectric coating,
    b) a first silver-based functional layer,
    c) one or two sacrificial metal layers, which may be sub-oxidised, wherein the metal is selected from one or several of the following materials from the group consisting of: Ti, Ni, Cr, Nb, Zn, Zr, Al, Ta and alloys thereof,
    d) an intermediate dielectric coating,
    e) a second silver-based functional layer, f) an absorbent layer containing an essentially metal absorbent material based on at least one of the following elements selected from the group consisting of: Rh, Ru, Os, Co, La, Ce, Pr, Nd, Mo, Mn, Hf, and alloys thereof, g) optionally, one or two sacrificial metal layers, possibly sub-oxidised, wherein the metal is selected from one or a combination of the following materials from the group consisting of: Ti, Ni, Cr, Nb, Zn, Zr, Al, Ta and alloys thereof, and h) an outer dielectric layer.

15. The lamination structure according to claim 12, wherein the lamination structure comprises at least the following sequence of layers in order starting with the sheet of vitreous material:

a) a first dielectric coating including at least one zinc-tin mixed oxide-based layer, b) a first silver-based functional layer, c) one or two sacrificial metal layers, which may be sub-oxidised, selected from one or a combination of the following materials from the group consisting of: Ti, Ni, Cr, Nb, Zn, Zr, Al, Ta and alloys thereof, d) an intermediate dielectric coating, e) a second silver-based functional layer, f) an absorbent layer based on at least one of the following elements selected from the group consisting of: Rh, Ru, Os, Co, La, Ce, Pr, Nd, Mo, Mn, and Hf, g) optionally, one or two sacrificial metal layers, which may be sub-oxidised, elected from one or a combination of the following materials from the group consisting of: Ti, Ni, Cr, Nb, Zn, Zr, Al, Ta and alloys thereof, and h) an outer dielectric layer including at least one zinc-tin mixed oxide-based layer.

16. The lamination structure according to claim 15, wherein all the dielectric coatings include a zinc-tin mixed oxide-based layer with approximately 50% tin and zinc, and a zinc-tin mixed oxide-based layer with not more than about 10% tin and at least about 90% zinc, this latter layer being each time arranged closer to a following functional layer than the mixed oxide layer with approximately 50% tin.

17. The lamination structure according to claim 1, wherein the lamination structure is finished by a thin carbon-based protective layer with a thickness of 1.5 to 10 nm.

18. A glass sheet bearing the lamination structure according to claim 1.

19. The glass sheet according to claim 18, wherein the glass sheet has a tint tested in reflection on a glass side represented by:

(a-1) L* in a range of between 30 and 55, or
(a-2) L* in a range of between 40 and 50, and
(b-1) a* in a range of between −4 and +3, or
(b-2) a* in a range of between −2.5 and +1.5, and
(c-1) b* in a range of between −4 and 16, or
(c-2) b* in a range of between −6 and −13.

20. The glass sheet according to claim 18, wherein the glass sheet was subjected to a toughening and/or bending thermal treatment after deposition of the multilayer lamination structure.

21. The glass sheet according to claim 20, wherein
4 to 35% of a light absorption of the lamination structure after thermal treatment is attributable to the absorbent material.

22. The glass sheet according to claim 21, wherein 8 to 22% of the light absorption of the lamination structure after thermal treatment is attributable to the absorbent material.

23. A multiple glazing comprising the glass sheet according to claim 18.

24. A multiple glazing according to claim 23, wherein the multiple glazing has a solar factor SF in a range of between 15 and 40%, a light transmission of at least 30% and a colour that is relatively neutral in transmission and neutral to slightly bluish in reflection on a side of the glass sheet bearing the lamination structure.

25. A multiple glazing according to claim 24, wherein the multiple glazing has (a-1) a solar factor SF in a range of between 20 and 35%, or
(a-2) a solar factor SF in a range of between 25 and 35%, and
(b-1) a light transmission of at least 45%, or
(b-2) a light transmission of at least 50%, or
(b-3) a light transmission of at least 55%.

26. A multiple glazing according to claim 23, wherein the multiple glazing has a tint in reflection on the side of the glass sheet bearing the laminated structure, wherein the lamination structure is arranged towards an inside space of the multiple glazing, represented by (a-1) L* in a range of between 40 and 55, or
(a-2) L* in a range of between 45 and 52, and
(b-1) a* in a range of between 1.5 and −6, or
(b-2) a* in a range of between 0.5 and −4, and
(c-1) b* in a range of between −3 and −15, or
(c-2) b* in a range of between −5 and −12.

27. An assembly formed from a first group and a second group, each of said groups comprising at least one glass sheet bearing the lamination structure according to claim 1, wherein the glass sheet of said first group was subjected to a toughening and/or bending thermal treatment after deposition of the multilayer lamination structure and wherein the glass sheet of said second group was not subjected to thermal treatment, wherein the two groups have a similar visual appearance in reflection on the glass side, such that they can be placed together without any significant visual change.

28. A multilayer sunshield lamination structure formed on a sheet of vitreous material comprising:

at least one functional layer composed of a silver-based material that reflects infrared radiation;

at least two dielectric coatings, one of which is the first dielectric coating deposited directly onto the sheet of vitreous material and the other lies on the outside in relation to the functional layer or layers, each functional layer being surrounded by dielectric coatings; and an essentially metal absorbent material based on at least one of the following elements selected from the group consisting of: Ru, Os, Co, Cr, La, Ce, Pr, Nd, W, Mo, Mn, Ti, V, Nb, Hf, Ta and alloys thereof, included in the functional layer, wherein said lamination structure, when deposited on an ordinary clear soda-lime float glass sheet 6 mm thick, has a solar factor SF of less than 45% and a light transmission LT of less than 70%.

29. The lamination structure according to claim 28, wherein the functional layer comprises 1 to 30 atom. % of absorbent material as alloy with, or doped with, the silver-based material reflecting infrared radiation.

30. The lamination structure according to claim 29, wherein the absorbent material included in the functional layer is selected from the group consisting of: Cr and W.

31. The lamination structure according to claim 29, wherein the absorbent material included in the functional layer comprises Os.

32. The lamination structure according to claim 29, wherein the functional layer contains 5 to 20 atom. %, of absorbent material as alloy with, or doped with, the silver-based material reflecting infrared radiation.

33. The lamination structure according to claim 28, wherein the functional layer comprises 5 to 10 atom % absorbent material.

34. A multilayer sunshield lamination structure formed on a sheet of vitreous material comprising:
   at least one functional layer composed of a silver-based material that reflects infrared radiation;
   at least two dielectric coatings, one of which is the first dielectric coating deposited directly onto the sheet of vitreous material and the other lies on the outside in relation to the functional layer or layers, each functional layer being surrounded by dielectric coatings; and
   an essentially metal absorbent material based on at least one of the following elements selected from the group consisting of: Au, Ir, Rh, Ru, Os, Co, Cu, La, Ce, Pr, Nd, W, Si, Mo, Mn, V, Hf, and alloys thereof at least partially forming part of a separate layer from the functional layer deposited under or on, and in direct contact with, the functional layer and forming an alloy with a sacrificial metal layer,
   wherein the sacrificial metal layer contains 5 to 20% absorbent material,
   wherein said lamination structure, when deposited on an ordinary clear soda-lime float glass sheet 6 mm thick, has a solar factor SF of less than 45% and a light transmission LT of less than 70%.

35. A multilayer sunshield lamination structure formed on a sheet of vitreous material comprising:
   at least one functional layer composed of a silver-based material that reflects infrared radiation;
   at least two dielectric coatings, one of which is the first dielectric coating deposited directly onto the sheet of vitreous material and the other lies on the outside in relation to the functional layer or layers, each functional layer being surrounded by dielectric coatings; and
   an essentially metal absorbent material based on at least one of the following elements selected from the group consisting of: Pd, Pt, Au, Ir, Rh, Ru, Os, Co, Ni, Cu, Cr, La, Ce, Pr, Nd, W, Si, Zn, Mo, Mn, Ti, V, Nb, Hf, Ta and alloys thereof included in the functional layer such that the functional layer comprises 8-30 atom. % absorbent material,
   wherein said lamination structure, when deposited on an ordinary clear soda-lime float glass sheet 6 mm thick, has a solar factor SF of less than 45% and a light transmission LT of less than 70%.

36. The lamination structure according to claim 35, wherein the functional layer comprises 8-20 atom. % absorbent material.

37. The lamination structure according to claim 35, wherein the functional layer comprises 8-10 atom. % absorbent material.

38. A multilayer sunshield lamination structure formed on a sheet of vitreous material comprising in order starting from the sheet of vitrious material:
   a first dielectric coating deposited directly onto the sheet of vitrious material;
   an outermost (relative to the sheet of vitreous material) functional layer composed of a silver-based material that reflects infrared radiation;
   an absorbent layer containing an essentially metal absorbent material based on at least one of the following elements selected from the group consisting of: Pd, Pt, Au, Ir, Rh, Ru, Os, Co, La, Ce, Pr, Nd and alloys thereof, formed directly on the functional layer;
   a first sacrificial metal layer, which may be sub-oxidised, wherein the metal is selected from one or a combination of the following materials from the group consisting of: Ti, Ni, Cr, Nb, Zn, Zr, Al, Ta and alloys thereof, formed directly on the absorbent layer; and
   optionally, a second sacrificial metal layer formed directly on the first sacrificial metal layer, which may be sub-oxidised, selected from one or a combination of the following materials from the group consisting of: Ti, Ni, Cr, Nb, Zn, Zr, Al, Ta and alloys thereof;
   a second dielectric coating;
   a topcoat comprising TiN arranged so that the first and second dielectric coatings and the functional layer are between the sheet of vitreous material and the topcoat;
   wherein said lamination structure, when deposited on an ordinary clear soda-lime float glass sheet 6 mm thick, has a solar factor SF of less than 45% and a light transmission LT of less than 70%.

39. The lamination structure according to claim 38, wherein:
   the absorbent layer comprises Pd,
   the metal in the first sacrificial layer comprises Ti,
   the second dielectric coating comprises at least one zinc-tin mixed oxide-based layer,
   and the TiN layer is the outermost (relative to the sheet of vitrious material) layer in the coating stack.

40. The lamination structure according to claim 39, wherein
   the absorbent layer has a thickness between 0.4 and 5 nm,
   the first sacrificial metal layer has a thickness of between 1 and 6 nm, and
   the TiN topcoat layer has a thickness of at least 5 nm.

41. The lamination structure according to claim 38, wherein
   the absorbent layer has a thickness between 0.4 and 5 nm,
   the first sacrificial metal layer has a thickness of between 1 and 6 nm, and
   the TiN topcoat layer has a thickness of at least 5 nm.

42. The lamination structure according to claim 38, wherein 8 to 22% of the light absorption of the lamination structure is attributable to the absorbent material.

* * * * *